Figure 1:
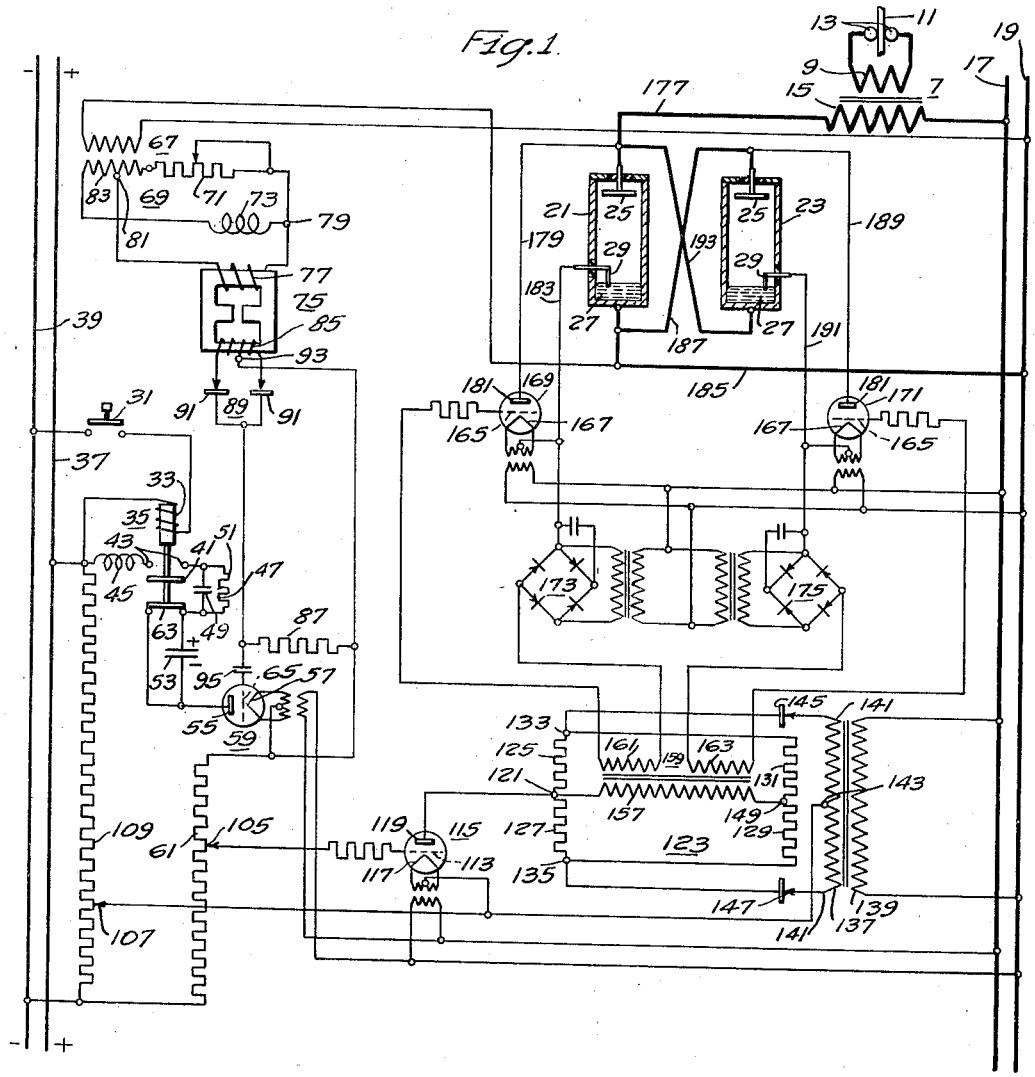

March 4, 1941. J. W. DAWSON 2,233,810
ELECTRIC DISCHARGE APPARATUS
Filed Jan. 28, 1938  2 Sheets-Sheet 2

WITNESSES:
E. A. McCloskey.
Hymen Diamond.

INVENTOR
John W. Dawson.
BY
F. W. Lyle.
ATTORNEY

Patented Mar. 4, 1941

2,233,810

UNITED STATES PATENT OFFICE 2,233,810

ELECTRIC DISCHARGE APPARATUS

John W. Dawson, Auburndale, Mass., assignor to Westinghouse Electric & Manufacturing Company, East Pittsburgh, Pa., a corporation of Pennsylvania Application January 28, 1938, Serial No. 187,487

23 Claims. (Cl. 250—27)

My invention relates to electric discharge apparatus and it has particular relation to apparatus for controlling electric discharge devices.

It is an object of my invention to provide a system of simple structure for supplying at intervals a number of current impulses of precisely predetermined magnitude to a load.

Another object of my invention is to provide a system for supplying at intervals a number of impulses, the magnitude of which shall be adjustable with facility to a load.

An ancillary object of my invention is to provide a control system of simple and tractable structure for an electric discharge device.

Another ancillary object of my invention is to provide a system incorporating rectifying elements that shall function in such manner as to eliminate the effect of the back current through the elements.

A specific object of my invention is to provide a spot welding system of simple structure that shall operate with high precision.

Another specific object of my invention is to provide a timing arrangement for a welding system wherein the effect of ambient temperature or other atmospheric variations in the principal timing impedances shall be compensated.

More specifically stated, it is in an object of my invention to provide a pushbutton or foot switch controlled spot welding system having heat control and precise timing.

According to my invention, I provide a control system of simple structure for the main discharge apparatus through which current is supplied intermittently to a welding load or a similar system. The system incorporates a capacitor which is charged through a second capacitor of considerably smaller magnitude and an auxiliary discharge device. The smaller capacitor supplies a series of charging impulses to the larger capacitor and is discharged after each impulse has been transmitted. As the larger capacitor gradually becomes charged, the current impulses and the resultant potential produced thereby across a voltage divider decrease in magnitude.

The potential impulses produced by the current pulses are used to control the main discharge apparatus. They are impressed on the control circuit of the main discharge apparatus through a biasing potential which is of such magnitude that the net control potential of the main discharge apparatus is exceeded by a number of charging potential impulses that correspond to the number of welding current impulses desired.

Figure 2:
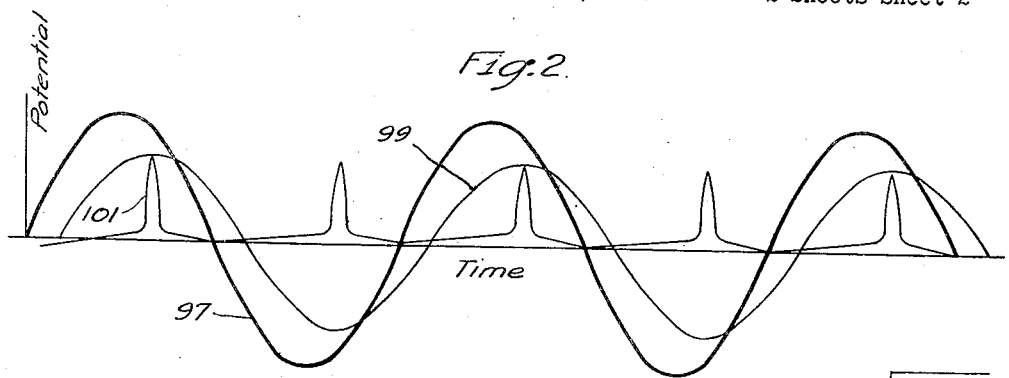
Figure 3:
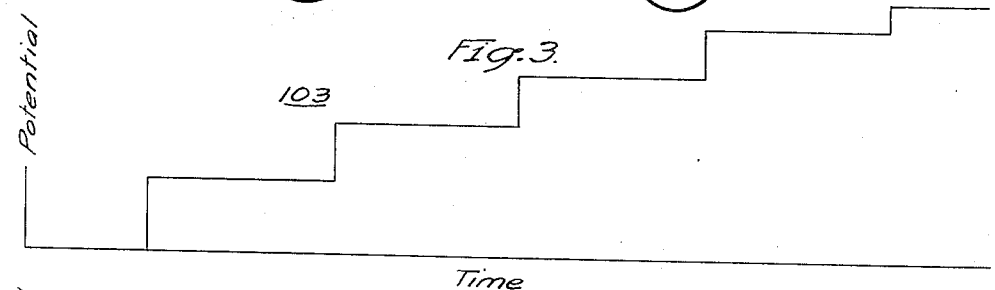
Figure 4:
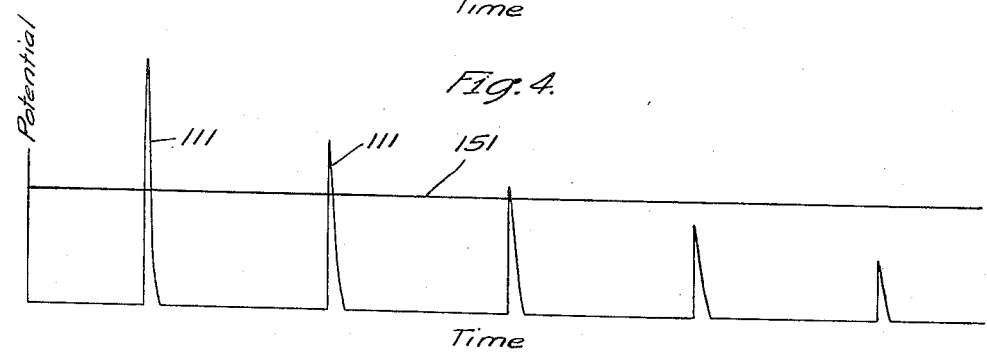
Figure 5:
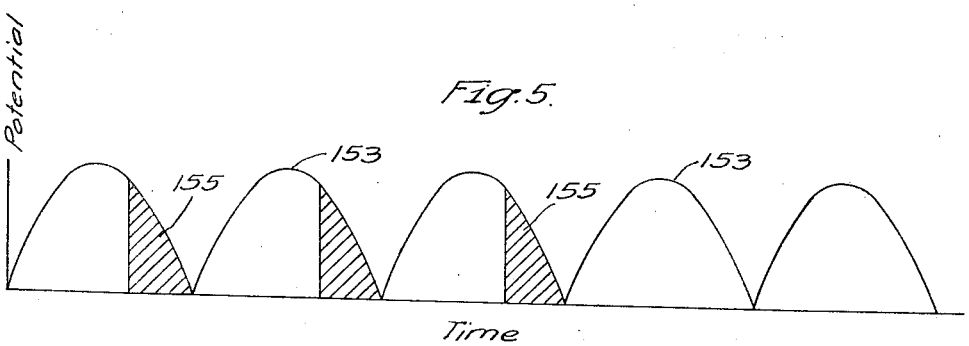

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1 is a diagrammatic view showing a preferred embodiment of my invention,

Fig. 2 is a graph illustrating the operation of one of the elements of the system shown in Fig. 1, Fig. 3 is another graph showing how another element of the system shown in Fig. 1 cooperates with the element corresponding to Fig. 2, Fig. 4 is a graph showing the potential impulses produced in the operation of my invention, and Fig. 5 is a further graph illustrating the timing of the operation of the main discharge apparatus in accordance with my invention.

The apparatus shown in Fig. 1 comprises a welding transformer 7 from the secondary 9 of which the material 11 to be welded is supplied with current through a pair of welding electrodes 13. The primary 15 of the welding transformer 7 is energized from a pair of alternating current bus conductors 17 and 19 through a pair of discharge devices 21 and 23. The devices 21 and 23 are connected between the supply conductors 17 and 19 and the primary 15 of the welding transformer 7 in anti-parallel so that the welding transformer is supplied with alternating current through them.

Preferably the discharge devices 21 and 23 are of the mercury-pool immersed-ignition-electrode type. Each device has an anode 25, a mercury-pool cathode 27 and an ignition electrode 29 composed of boron carbide, silicon carbide or a similar element immersed in the mercury.

In lieu of the mercury pool immersed electrode discharge devices, discharge devices of other types, such as mercury pool tubes, in which the ignition is through an external collar adjacent to the cathode container or hot cathode gaseous discharge tubes, may be utilized.

To produce the desired welding operations the welding current is supplied during precisely timed intervals. The units of time used for measuring the length of the intervals are the half-periods of the supply source. The main discharge devices 21 and 23 are rendered conductive during half cycles of the source which correspond in number to the certain interval during which welding current is to flow. The magnitude of the heating energy supplied for welding is controlled by rendering the discharge devices 21 and 23 conductive at certain points in the half cycles during which welding current flows. The complete control of the welding current depends on the control of the discharge devices 21 and 23 and to properly control the latter, the excitation of the ignition electrodes 19 is controlled.

When the supply of a series of current impulses to produce a spot weld is to be initiated, a pushbutton 31 connected in series with the exciting coil 33 of a starting relay 35 is closed. By closing the pushbutton 31, the relay coil 33 is connected to a pair of direct current bus conductors 37 and 39 and the relay is energized. The upper movable contactor 41 of the relay then engages a pair of fixed contacts 43, closing a circuit extending from the positive bus conductor 37 through a reactor 45, the upper movable contactor 41, a parallel network 47 consisting of a capacitor 49 and a resistor 51 bridging the capacitor, a second capacitor 53, the anode 55 and the cathode 57 of an auxiliary discharge device 59, and a resistor 61 to the negative bus conductor 39. The relay 35 is also provided with a lower movable contactor 63 which is normally closed and maintains a short circuit for the second capacitor 53 so that it is normally completely discharged. When the relay is energized, the short circuit is removed.

The magnitude of the second capacitor 53 is large compared to that of the first capacitor 49 and should in the usual practice of my invention have a capacity of the order of 10 times that of the first capacitor. The auxiliary discharge device 59 is preferably of the hot cathode gaseous type although it may be of the hot cathode high vacuum type and is provided in addition to the anode 55 and the cathode 57 with a control electrode 65.

Control potential sufficient to substantially increase the conductivity of the auxiliary discharge device 59 at the anode cathode potential provided by the conductors 37, 39 is provided from the alternating current bus conductors 17 and 19 through an auxiliary transformer 67, a phase shift network 69 of the usual type comprising a resistor 71 and a reactor 73, and a saturable transformer 75. The primary 77 of the saturable transformer 75 is connected between the junction point 79 of the resistor 71 and the reactor 73 and an intermediate tap 81 of the secondary 83 of the auxiliary transformer 67. The resistor 71 is of variable magnitude so that the phase may be adjusted to any desired value. The potential derived at the terminals of the secondary 85 of the saturable transformer 75 is of peaked wave form and displaced in phase relative to the potential supplied by the alternating current bus conductors 17 and 19 by an amount dependent on the setting of the variable resistor 71. The secondary 85 supplies a resistor 87 in the control circuit of the auxiliary discharge device 59 through a full wave rectifier 89, preferably consisting of a pair of copper-copper-oxide discs 91. One electrode of each of the discs 91 is connected in the usual manner to the terminals of the secondary 85 and the other electrodes of the discs are connected together and to one terminal of the resistor 87. The other terminal of the resistor is connected to the intermediate tap 93 of the secondary 85. The resistor 87 is connected between the cathode 57 and the control electrode 65 of the auxiliary discharge device 59 through a suitable grid capacitor 95.

The potential relationship of the phase shifting and impulsing system 67, 69, 75 on the auxiliary discharge device is illustrated graphically in Fig. 2. In this graph the potential is plotted as ordinate and the time as abscissa. The heavy sine curve 97 represents the potential supplied by the alternating current bus conductors 17 and 19. The light sine curve 99 represents the dephased potential supplied to the primary 77 of the saturable transformer 75. The peaked curve 101 represents the potential supplied to the resistor 87 in the control circuit of the auxiliary discharge device 59 and thus represents the energizing potential supplied to the device 59.

When the circuit through the anode 55 and the cathode 57 of the auxiliary discharge device 59 is closed by the contactor 41 and an impulse is impressed from the saturable transformer 75 in the control circuit of the auxiliary discharge device, the latter is rendered conductive and an impulse of charging current is transmitted through the anode-cathode circuit. The larger capacitor 53 is partially charged by an amount that is limited by the smaller capacitor 49. Since an inductor 45 is also present in the circuit, the total difference of potential across the two capacitors is at the end of the charging impulse somewhat greater than the potential of the direct current source 37, 39. Therefore, at this instant, the net potential impressed between the anode 55 and the cathode 57 of the auxiliary discharge device 59 is negative in polarity and the latter device is extinguished. The potential maintaining the two capacitors 49 and 53 charged is removed and the smaller capacitor 49 is immediately discharged through its associated resistor 51. As a result the anode-cathode potential across the discharge device 59 is again rendered positive, albeit to a smaller value than originally and the discharge device is again rendered conductive. The above process is now again repeated and the repetition continues until the large capacitor 53 is substantially completely charged.

The charging of the large capacitor is illustrated in Fig. 3 by the step-like curve 103. In this graph the potential across the large capacitor 53 is plotted vertically and time horizontally. The time coordinates correspond to those of Fig. 1 and, as will be seen, each rise in the potential across the capacitor 53 corresponds to the occurrence of an energizing impulse 101 in the control circuit of the auxiliary discharge device. Since an energizing impulse is impressed during each half-period of the sources 17 and 19, there is a rise in the potential across the capacitor 53 during each half-period, i. e., a charging impulse is transmitting during each half-period.

Corresponding to each charging impulse, a current impulse is transmitted through the resistor 61 in series with the auxiliary discharge device and a potential impulse is impressed between the adjustable tap 105 of the resistor and the adjustable tap 107 of a voltage divider 109 connected across the direct-current bus conductors 37 and 39. As the large capacitor 53 gradually becomes charged, the magnitude of the potential impulses impressed between the two adjustable taps 105 and 107 decreases in amplitude. This situation is illustrated graphically in Fig. 4, in which time is again plotted as abscissa and the potential between the movable taps as ordinate. The time coordinates correspond to those of Figs. 2 and 3.

At the instant that each step in potential illustrated by the curve 103 shown in Fig. 3 occurs, a corresponding potential impulse represented by the peaks 111 is impressed between the adjustable tap 105 of the resistor 61 and the adjustable tap 107 of the potentiometer 109. The decrease in the height of the peaks 111 shows how the potential impulses gradually decrease in magnitude.

It is to be noted that while in the embodiment shown herein a large capacitor is charged in half-cycle steps through a small capacitor and a discharge device, a system in which a normally charged capacitor is discharged in half-cycle steps through a small capacitor and a discharge device is within the scope of my invention.

The adjustable tap 105 of the resistor 61 is connected to the control electrode 113 of a second auxiliary discharge device 115 which is preferably of the hot cathode gaseous type but may also be of the high vacuum type. The adjustable tap 107 of the voltage divider 109 is connected to the cathode 117 of the auxiliary discharge device 115. The anode 119 of the latter device is connected to one of the output terminals 121 of a network 123 of the Wheatstone bridge type. The network 123 comprises four resistors 125, 127, 129 and 131, preferably of equal magnitude, connected in series in the usual manner. The input terminals 133 and 135 of the network are at the junction points of the resistors 125 and 131 and 127 and 129 and are supplied with potential from the secondary 137 of a transformer 139 which is energized from the main lines 17 and 19. The secondary 137 is provided with a plurality of terminal taps 141 and an intermediate tap 143. The terminal taps of the secondary are connected to the input terminals 133 and 135 of the network through half wave rectifiers 145 and 147 which may be of the copper-copper-oxide type. The rectifiers are so connected that current flow through one of the rectifiers (say 145) and through the resistors (125 and 127) of the network is blocked by the other rectifier (147). It is seen that whatever back current the rectifiers 145 and 147 transmit will not tend to produce a potential between the output terminals 121 and 149 of the network inasmuch as current flowing wholly and only through the bridge impedances between the terminals 141 does not unbalance the bridge. However, the cathode 117 of the auxiliary discharge device 115 is connected to the intermediate tap 143 and substantial current may flow through either of the rectifiers 145 or 147 in its current passing direction and through the auxiliary discharge device 115 if the latter happens to be conductive. Current flow of this type does unbalance the bridge.

By reason of the connection of its anode 119 and the cathode 117 between the points 121 and 143, the discharge device 115 is supplied with anode-cathode potential. If the potential impressed between the adjustable taps 105 and 107 of the resistor 61 and the voltage divider 109 is more positive than the critical control potential, the discharge device is energized. It will be recalled that a potential peak is impressed between the taps 105 and 107 during each half period of the source 17, 19 when the button 31 is closed. During a number of half cycles, predeterminable at will by properly adjusting the position of the taps 105 and 107, potential peaks sufficient to render the discharge device 115 conductive may be impressed between the control electrode 113 and the cathode 115. The auxiliary discharge device 115 will, therefore, be conductive during a number of half cycles which may be determined at will.

The selection of a number of half cycles during which the second auxiliary discharge device 115 is conductive is illustrated in Fig. 4. The horizontal line 151 above and parallel to the time axis represents the critical control potential of the discharge device. When the peaks 111 representing the potential impressed between the adjustable taps 105 and 107 extend above this line, the auxiliary discharge device 115 is conductive. It will be noted that in a system corresponding to Fig. 4, the discharge device will be energized during three half cycles of the source.

The function of the auxiliary discharge device 115 in cooperation with the balanced network 123 is illustrated in Fig. 5, in which time is again plotted as abscissa and the potential across the discharge device as ordinate and the time coordinates correspond to the same coordinates of Figs. 2, 3 and 4. The half sine waves 153 of Fig. 5 represent the anode cathode potentials of the auxiliary discharge device 115 which are impressed through the rectifiers 145 and 147 of the balanced network. The shaded area 155 of the first three half waves represents the intervals during which the discharge device 115 is conductive. The inductive reactance in the anode circuit of the discharge device 115 is so small that it is rendered nonconductive when its anode-cathode potential becomes substantially zero, i. e., at the end of each of the half cycles as represented in Fig. 5.

When the discharge device 115 is conductive, current flows through the resistors 125 and 127 of the network 123. During the first half cycle, say, when the upper rectifier 145 is conductive, a pulse of current is transmitted in a circuit extending from the upper terminal 141 of the secondary 137 through the rectifier 145, the upper resistor 125, the auxiliary discharge device 115 to the intermediate tap 143 of the secondary. The current transmitted through the opposite resistor 131 of the network 123 is negligible because the impedance of primary 157 of the output transformer 159 connected between the output terminals 121 and 149 of the network is high. When the impulse is transmitted through the resistor 125, the network is unbalanced, a potential impulse is impressed across the primary 157 of the output transformer 159 and corresponding impulses are impressed on the secondaries 161 and 163.

The situation is similar when the potential of the secondary 137 of the input transformer 139 is such that the lower rectifier 147 is conductive. In this case the potential impulse impressed across the primary 157 of the output transformer 159 is again of the same polarity as the potential impulse impressed in the first discussed case and again potential impulses are impressed in the secondaries 161 and 163 of the output transformer.

The secondaries 161 and 163 of the output transformer 159 are connected between the control electrodes 165 and the cathodes 167 of the ignition discharge devices 169 and 171 through suitable biasing sources 173 and 175. Each of the ignition devices is associated with a corresponding main discharge device 21 or 23. The left-hand ignition device 169 is connected in a circuit extending from the left-hand alternating bus conductor 17 through the primary 15 of the welding transformer 7, a conductor 177, a conductor 179, the anode 181 of the discharge device, the cathode 167 of the discharge device, a conductor 183, the ignition electrode 29 of the left-hand discharge device 21, a conductor 185 to the right-hand alternating bus conductor 19. The right-hand ignition discharge device 171 is connected in a circuit extending from the right-hand alternating bus conductor 19 through the conductor 185, a conductor 187, a conductor 189, the anode 181 of the discharge device, the cathode 167 of the discharge device, a conductor 191, the ignition electrode 29 of the right-hand main discharge device 23, a conductor 193, the conductor 177, the primary 15 of the welding transformer 7 to the left-hand alternating bus 17.

Accordingly, anode-cathode potentials are impressed on the ignition discharge devices 169 and 171 that are alternatively positive and negative for intervals of half cycles. The connection of the secondaries 161 and 163 of the output transformer 159 is such that when impulses are impressed in the secondaries, their effect is to render the control electrodes 165 positive relative to the cathodes 167. Hence when the network 123 is unbalanced, the ignition discharge devices 169 and 171 are rendered conductive as their anode-cathode potentials become positive. The impulses are transmitted through the discharge device 115 and, therefore, through the primary 157 of the output transformer 159 at instants in the half periods of the source 17—19, which are preset by the phase shift network 69 as can be seen from the position of the shaded areas 155 in Fig. 5. The ignition devices 169 and 171 are, therefore, rendered conductive at the present instants in the half periods of the source.

When an ignition discharge device 169 or 171 is rendered conductive, current is transmitted through the corresponding ignition electrode 29 and the corresponding main discharge device 21 or 23 is rendered conductive at the preset point in the half period and current is transmitted through the primary 15 of the welding transformer 7 and, therefore, through the material 11. The actuation is similar for the other main discharge device in its turn and the excitation of the main discharge devices continue as long as the auxiliary device 115 remains conductive. By the closing of the pushbutton 31, therefore, the welding material 11 is supplied with current for an interval of time which depends on the number of half cycles selected (three in the case of Fig. 5) and the welding material is heated to an extent dependent on the points in the half cycles at which the current supply is initiated. A weld of high quality may thus be produced in accordance with my invention.

Moreover, the control potential applied to the auxiliary device 115 is a function of the ratio of the capacities of the large capacitor 53 and the small capacitor 49 and not of their absolute capacities, temperature and other ambient conditions (such as ageing, for example) which produce the same relative changes in the absolute capacities of the capacitors do not therefore affect the control potentials and hence do not affect the timing.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Apparatus for controlling the supply of power from a source of electrical energy to a load comprising valve means interposed between said source and said load, means to have a plurality of impulses of electrical energy impressed thereon and when certain of said impulses only are impressed functioning to render said valve means conductive, and means for supplying said plurality of impulses, said supply means including charge storing means and a charging circuit for said charge storing means including means for supplying continuous direct current and means permitting the repeated flow of current impulses from said supply means to charge said charge storing means, each of said current impulses producing one of said impulses of electrical energy.

2. Apparatus for controlling the supply of power from a source of electrical energy to a load comprising valve means interposed between said source and said load, means to have impulses of electrical energy impressed thereon and when said impulses are impressed functioning to render said valve means conductive and means for supplying said impulses, said supply means including charge storing means and a charging circuit for said charge storing means permitting the repeated flow of current impulses to charge said charge storing means, said charging circuit including additional charge storing means of charge capacity that is small compared to the capacity of said first named charge storing means.

3. Apparatus for controlling the supply of power from a source of electrical energy to a load comprising valve means interposed between said source and said load, means to have impulses of electrical energy impressed thereon and when impulses are impressed functioning to render said valve means conductive and means for supplying said impulses, said supply means including charge storing means and a charging circuit for said charge storing means permitting the repeated flow of current impulses to charge said charge storing means, said charging circuit including additional charge storing means of charge capacity that is small compared to the capacity of said first named charge storing means and means for discharging said additional charge storing means after a current impulse has been supplied to said first named charge storing means.

4. Apparatus for supplying power from a source of electrical energy to a load for an interval of time that is predeterminable at will and for interrupting the supply for at least a second interval of time that is predeterminable at will comprising valve means interposed between said source and said load, control means for said valve means to have a plurality of impulses of electrical energy of progressively decreasing magnitude impressed thereon and, when certain of said impulses of at least a predetermined magnitude are impressed, functioning to render said valve means conductive and means for providing said plurality of impulses, said providing means including charge storing means and a charging circuit for said charge storing means including means for supplying continuous direct current and means permitting the repeated flow of current of progressively decreasing magnitude from said source to charge said charge storing means, the flow of current of each said magnitude corresponding to one of said impulses of electrical energy.

5. Apparatus for controlling the supply of power from a source of periodically pulsating electrical energy to a load comprising valve means interposed between said source and said load, means to have a plurality of impulses of electrical energy impressed thereon and when certain of said impulses only are impressed functioning to render said valve means conductive and means for supplying said plurality of impulses, said supply means including charge storing means and a charging circuit for said charge storing means, said charging circuit including means for supplying continuous direct current, auxiliary valve means in circuit with said supply means and said charge storing means and means for rendering said auxiliary valve means conductive in synchronism with said source to permit the repeated flow of current impulses to charge said charge storing means, each of said current impulses producing one of said impulses of electrical energy.

6. Apparatus for controlling the supply of power from a source of periodically pulsating electrical energy to a load comprising valve means interposed between said source and said load, means to have a plurality of impulses of electrical energy impressed thereon and when certain of said impulses only are impressed functioning to render said valve means conductive and means for supplying said plurality of impulses, said supply means including charge storing means and a charging circuit for said charge storing means, said charging circuit including auxiliary valve means and means for supplying electrical energy impulses of short duration compared to a period of said source to render said auxiliary valve means conductive in synchronism with said source to permit the repeated flow of current impulses to charge said storing means, each of said current impulses producing one of said impulses of electrical energy.

7. Apparatus for controlling the supply of power from a source of electrical energy to a load comprising valve means interposed between said source and said load, means to have a plurality of impulses of electrical energy impressed thereon and when certain of said impulses are impressed functioning to render said valve means conductive and means for supplying said plurality of impulses, said supply means including charge storing means and a charging circuit for said charge storing means, said charging circuit including auxiliary valve means and means for supplying electrical energy impulses of substantially perpendicular wave front to said auxiliary valve means to render said auxiliary valve means conductive and permit the repeated flow of current impulses to change said charge storing means, each of said current impulses producing one of said impulses of electrical energy.

8. In combination a network of the Wheatstone bridge type having a pair of input and a pair of output terminals, a source of potential, means for connecting said source to one of the input terminals of said network through means blocking substantial current flow in only one direction, means for connecting said source to the other input terminal of said network through additional means blocking substantial current flow in only one direction, a conductive path interposed between said source and said input terminals permitting conduction of current from said source through said blocking means, and means for deriving a potential between said output terminals.

9. In combination a network of the Wheatstone bridge type having a pair of input and a pair of output terminals, a source of potential, means for connecting said source to one of the input terminals of said network through means blocking substantial current flow in only one direction, means for connecting said source to the other input terminal of said network through additional means blocking substantial current flow in only one direction, said additional means being so connected as to block substantial current flow in the direction that it is permitted by said first named blocking means, control means connected between one of said output terminals and said source permitting current flow through either of said blocking means and means for deriving a potential between said output terminals.

10. In combination a network of the Wheatstone bridge type having a pair of input and a pair of output terminals, a source of potential, means for connecting said source to one of the input terminals of said network through means blocking substantial current flow in only one direction, means for connecting said source to the other input terminal of said network through additional means blocking substantial current flow in only one direction, said additional means being so connected as to block substantial current flow in the direction that it is permitted by said first named blocking means, control means including an electric discharge device having a control electrode and a plurality of principal electrodes connected between one of said output terminals and said source permitting current flow through either of said blocking means and means for deriving a potential between said output terminals.

11. In combination a network of the Wheatstone bridge type having a pair of input and a pair of output terminals, a source of potential, means for connecting said source to one of the input terminals of said network through means blocking substantial current flow in only one direction, means for connecting said source to the other input terminal of said network through additional means blocking substantial current flow in only one direction, said additional means being so connected as to block substantial current flow in the direction that it is permitted by said first named blocking means, control means including a gaseous electric discharge device having a control electrode and a plurality of principal electrodes connected between one of said output terminals and said source permitting current flow through either of said blocking means and means for deriving a potential between said output terminals.

12. In combination a network of the Wheatstone bridge type having a pair of input and a pair of output terminals, a source of potential, means for connecting said source to one of the input terminals of said network through means blocking substantial current flow in only one direction, means for connecting said source to the other input terminal of said network through additional means blocking substantial current flow in only one direction, said additional means being so connected as to block substantial current flow in the direction that it is permitted by said first named blocking means, current rectifying means connected between one of said output terminals and said source permitting current flow through either of said blocking means and means for deriving a potential between said output terminals.

13. In combination a network of the Wheatstone bridge type having a pair of input and a pair of output terminals, a source of alternating potential having a pair of terminal taps and an intermediate tap, means including current rectifying means for connecting one of said terminal taps to one input terminal of said network, means including current rectifying means for connecting another terminal tap to an input terminal of said network, a conductive path between said input terminals and said intermediate tap, and means for deriving a potential between the output terminals of said network.

14. In combination a network of the Wheatstone bridge type having a pair of input and a pair of output terminals, a source of alternating potential having a pair of terminal taps and an intermediate tap, means including current rectifying means for connecting one of said terminals taps to one input termianl of said network, means including current rectifying means for connecting another terminal tap to another input terminal of said network, the last said current rectifying means being connected so as to block current flow through the first said rectifying means, control means connected between one of the output terminals of said network and said intermediate tap permitting current flow through both said rectifying means, and means for deriving a potential between the output terminals of said network.

15. Apparatus for controlling the supply of power from a source of electrical energy to a load comprising valve means interposed between said source and said load, means to have impulses of electrical energy impressed thereon and when said impulses are impressed functioning to render said valve means conductive and means for supplying said impulses, said supply means including charge storing means and a charging circuit for said charge storing means permitting the repeated flow of current impulses to charge said charge storing means said storing means being charged by a plurality of said impulses, said charge storing circuit including means for supplying a potential, auxiliary valve means and means alone operative to render said auxiliary valve means non-conductive after each repetition of the flow of said current.

16. Apparatus for controlling the supply of power from a source of electrical energy to a load comprising valve means interposed between said source and said load, means to have impulses of electrical energy impressed thereon and when said impulses are impressed functioning to render said valve means conductive and means for supplying said impulses, said supply means including charge storing means and a charging circuit for said charge storing means permitting the repeated flow of current impulses to charge said charge storing means said storing means being charged by a plurality of said impulses, said charge storing circuit including means for supplying a potential, auxiliary valve means and means alone operative to produce a counter potential to render said auxiliary valve means non-conductive after each repetition of the flow of said current.

17. Apparatus for controlling the supply of power from a source of electrical energy to a load comprising valve means interposed between said source and said load, means to have impulses of electrical energy impressed thereon and when said impulses are impressed functioning to render said valve means conductive and means for supplying said impulses, said supply means including charge storing means and a charging circuit for said charge storing means permitting the repeated flow of current impulses to charge said charge storing means said storing means being charged by a plurality of said impulses, said charge storing circuit including means for supplying a potential, auxiliary valve means and reactive means cooperative only with the other elements of said storing circuit for rendering said auxiliary valve means non-conductive after each repetition of the flow of said current.

18. Apparatus for controlling the supply of power from a source of electrical energy to a load comprising valve means interposed between said source and said load, means to have a plurality of impulses of electrical energy impressed thereon and when certain of said impulses are impressed functioning to render said valve means conductive, and means for supplying said impulses, said supply means including charge storing means and a circuit for said charge storing means including means for supplying a continuous direct current and means permitting the repeated flow of current impulses from said supply means to change the charge on said charge storing means, each of said current impulses producing one of said impulses of electrical energy.

19. Apparatus for controlling the supply of power from a source of periodically pulsating electrical energy to a load comprising valve means interposed between said source and said load, means to have impulses of electrical energy impressed thereon and when said impulses are impressed functioning to render said valve means conductive and means for supplying said impulses, said supply means including charge storing means and a charging circuit for said charge storing means, said charging circuit including auxiliary valve means and means for rendering said auxiliary valve means conductive in synchronism with said source to permit the repeated flow of current impulses to charge said charge storing means, said current impulses flowing to said charge storing means through auxiliary charge storing means, having a capacity that is small compared to the capacity of the main charge storing means and means for discharging said auxiliary storing means after each supply of a charging impulse to the main storing means.

20. Apparatus for controlling the supply of power from a source of periodically pulsating electrical energy to a load comprising valve means interposed between said source and said load, means to have impulses of electrical energy impressed thereon and when said impulses are impressed functioning to render said valve means conductive and means for supplying said impulses, said supply means including charge storing means and a charging circuit for said charge storing means, said charging circuit including auxiliary valve means and means for rendering said auxiliary valve means conductive in synchronism with said source to permit the repeated flow of current impulses to charge said charge storing means, said current impulses flowing to said charge storing means through auxiliary charge storing means, having a capacity that is small compared to the capacity of the main charge storing means and means forming a complete metallic connection across said auxiliary storing means for discharging said auxiliary storing means after each supply of a charging impulse to the main storing means.

21. Apparatus for controlling the supply of power from a source of electrical energy to a load comprising valve means interposed between said source and said load, means to have impulses of electrical energy impressed thereon and when said impulses are impressed functioning to render said valve means conductive and means for supplying said impulses, said supply means including charge storing means and a charging circuit for said charge storing means permitting the repeated flow of current impulses to charge said charge storing means, said charge storing means comprising a portion of small capacity and a portion of large capacity connected in series so that a series of charging impulses sufficient to charge said small capacitor is required to charge said large capacitor and said charge storing circuit including means cooperative with said portion of small capacity to render said valve means non-conductive after each repetition of the flow of said current.

22. In combination a valve of the gaseous arc-like type, a source of potential the magnitude of which at all times remains above the arc-drop of said valve and charge storing means of large capacity and charge storing means of small capacity connected in series between said source and said valve.

23. In combination a valve of the gaseous arc-like type, a source of potential the magnitude of which at all times remains above the arc-drop of said valve, charge storing means of large capacity and charge storing means of small capacity connected in series between said source and said valve, and means for discharging said storing means of small capacity.

JOHN W. DAWSON.